United States Patent [19]
Robert

[11] Patent Number: 5,578,191
[45] Date of Patent: Nov. 26, 1996

[54] PROCESS FOR EXTRACTING TIN FROM ORGANIC SOLUTIONS BY ELECTROLYSIS

[75] Inventor: Philippe G. Robert, Poncey, France

[73] Assignee: Eastman Kodak Company, Rochester, N.Y.

[21] Appl. No.: 508,876

[22] Filed: Jul. 28, 1995

[30] Foreign Application Priority Data

Aug. 11, 1994 [FR] France ................................. 94 10093

[51] Int. Cl.$^6$ ..................................................... C25D 5/02
[52] U.S. Cl. ........................................... 205/614; 205/750
[58] Field of Search ................................. 205/614, 750, 205/770, 771, 701, 702; 204/DIG. 13

[56] References Cited

U.S. PATENT DOCUMENTS

| | | | |
|---|---|---|---|
| 4,437,949 | 3/1984 | Holland | 204/59 |
| 4,514,270 | 4/1985 | Furutani | 205/702 |
| 4,652,351 | 3/1987 | Vaughan | 205/560 |
| 4,857,159 | 8/1989 | Davis | 205/510 |
| 4,944,851 | 7/1990 | Cordani | 205/575 |

FOREIGN PATENT DOCUMENTS

| | | |
|---|---|---|
| 119441 | 10/1978 | German Dem. Rep. . |
| 2647006 | 6/1977 | Germany . |
| WO9001077 | 2/1990 | WIPO . |

Primary Examiner—Arun S. Phasge
Assistant Examiner—Brendan Me
Attorney, Agent, or Firm—John R. Everett

[57] ABSTRACT

The present invention concerns a process for the electrolytic extraction of the tin found a quantity of less than 1 g/l and in a chelated form in organic solutions.

The process consists of using an electrolysis unit comprising an anode compartment and cathode compartment separated by a physical barrier, introducing the organic solution into the cathode compartment and carrying out the electrolysis in galvanostatic or potentiostatic mode.

This process can be applied to the recycling of photographic effluents containing tin, in particular to the processing of reversal products.

6 Claims, 7 Drawing Sheets

PROCESS FOR EXTRACTING TIN FROM ORGANIC SOLUTIONS BY ELECTROLYSIS

FIELD OF THE INVENTION

The present invention concerns a process for the electrolytic extraction of tin from organic solutions, in particular solutions containing tin in chelated form.

The invention also concerns the use of this process for recovering the tin contained in photographic baths in order to recycle or dump them, for example the tin contained in photographic baths which are used in the processing of reversal products.

BACKGROUND OF THE INVENTION

Conventional processing of reversal films and papers comprises a reversal step between the black and white development and the color development. An example of such processing is the Ektachrome E-6® process described in detail in Chimie et Physique Photographiques Tome 2, P Glafkides, 5th edition, pages 954 et seq.

During the reversal step, the tin is present initially in the form of a stannous salt in the reversal bath. A certain quantity of this bath is conveyed mechanically with the film into the color development bath by capillary effect at the perforations and by impregnation of the layer of gelatin on the films. The tin is principally in a chelated form in the color development bath.

In practice, the color development takes place in a tank in which the film being processed passes. New development bath is regularly added to compensate for the exhaustion of the substances. It is desirable to recycle the bath for environmental protection reasons. During recycling, the tin content increases. If it exceeds approximately 0.2 g/l, the sensitometric properties of the film are effected thereby. This is why it is desirable to extract, at least partially, the tin contained in the color development bath, without modifying the other components of the bath.

Recovery of the tin by electrolysis is described in many patents. For example UK patent 2 159 139 describes a process for recovering the tin from products or concentrates containing quantities of tin of around 10 to 30%. For this purpose, the starting material is subjected to decomposition by potash in the presence of an inert gas or air, and then washed with water at a high temperature, and the solution obtained is electrolysed with a current density of between 50 and 500 A/m$^2$. In this way up to 90% of the tin in a solution containing 30 g/l is recovered by electrolysis.

The patent DD 119 441 describes a process for eliminating tin from solutions originating from the refining of tin by alkali electrolysis. To do this, the Na$_2$S electrolyte enriched with tin and carbonate is subjected continuously to a second electrolysis with a non-oxidising anode using DC at an anode current density greater 850 A/m$^2$, a cathode current density below 100 A/m$^2$ and a temperature below 30° C. The electrolyte is then recycled. In this way the concentration of tin is reduced from 50–70 g/l to 1–3 g/l.

The patent DE 2 647 006 describes the recovery of tin from the scrap from tin-enamelled sheet metal in which, after heating the scrap, treating it with soda and washing it, the solution containing 30 to 80 g/l of tin is subjected to a two-stage electrolysis with current densities of 100–150 A/m$^2$ in the first stage and 50–70 A/m$^2$ in the second stage at 80°–90° C. In this way 30 to 90% of the tin is recovered.

The patent WO 9001077 describes a process of electrolytic precipitation for the recovery of metals contained in photographic processing solutions. In this process, the solution, which contains metal in the form of thiosulphate or sulphite is decomposed by electrolysis without there being any deposition of metal at the cathode. The metal is recovered in the form of metallic sulphur by filtration. This method makes it possible to recover various metals including Sn but it is preferably applied to the recovery of silver.

These patents of the prior art do not make it possible to recover, by electrolysis, the tin contained in organic solutions in which the tin is mainly in a chelated form.

U.S. Pat. No. 4,437,949 describes a process and a device for recovering tin or forming organic tin compounds by the electrolysis of halogenated organic complexes of tin obtained during the manufacture of organo-tin halides by the reaction of organic halides with tin. The solutions subjected to electrolysis comprise from 10 to 20 g/l of tin.

In this device, an anode is placed in an aqueous anolyte and the cathode in the catholyte, which forms a phase which is non-miscible with the water containing the halogenated tin complex. The electrical current is conveyed electrolytically between these two phases. The anolyte is separated from the catholyte by the liquid/liquid interface between the aqueous anolyte and the catholyte which is non-miscible with the aqueous anolyte. During the electrolysis, the organic phase is enriched with dendritic tin.

SUMMARY DESCRIPTION OF THE INVENTION

Thus one object of the present invention is a novel process for extracting tin contained in highly reducing organic solutions with a pH above 10 and in which the tin is in a quantity below 1 g/l, mainly in a chelated form.

Another object of the invention is to extract, from color development baths, the tin which is found therein in a chelated form and which originates from the reversal bath, in the processing of reversal products.

Another object of the invention is the recycling of the color development bath from reversal processes whilst maintaining the level of tin at an acceptable value.

The process according to the present invention for recovering tin contained in an aqueous organic solution having a highly reducing nature and a pH of more than 10, where the tin is in a quantity of less than 1 g/l, mainly in a chelated form, consists of using an electrolysis unit comprising an anode compartment and a cathode compartment separated by a physical barrier, introducing the organic solution into the cathode compartment and carrying out the electrolysis in galvanostatic or potentiostatic mode.

According to a preferred embodiment, the electrolysis is carried out in galvanostatic mode with a pulsating electrolysis current having a duty factor $R_C$ of between 25% and 85%, $R_C$ being defined by the formula: $R_C = t_{work}/(t_{idle} + t_{work})$, where $t_{work}$ represents the time during which a operating current with an intensity of between 5 and 60 mA for a cathode surface area of 1.19 dm$^2$ is passed through the cathode, and $t_{idle}$ represents the time during which a maintenance current is caused to pass, the intensity of which represents approximately 10 to 20% of the operating current. In the framework of the invention, the current density is therefore between 4 and 50 mA/dm$^2$.

This maintenance current serves to prevent the redissolving of tin on the cathode.

The advantage of the process according to the invention is that it makes it possible to extract some of the tin contained in the color development bath used in the processing of reversal products without destroying the other components of the bath.

The process according to the invention allows the recycling of this bath, which preserves the environment by reducing the effluents. The use of a solution thus recycled has no undesirable effects on the sensitometric characteristics of the final photographic product.

BRIEF DESCRIPTION OF THE DRAWINGS

In the following description, reference will be made to the following figures.

DETAILED DESCRIPTION OF THE INVENTION

The present invention will be explained in detail, using, as an example of an organic solution containing tin in a chelated form, a color development bath from the E-6® process containing tin originating from the reversal bath.

In the reversal bath, the tin is in the form of a tin salt, for example $SnCl_2$. The tin is brought into the color bath, which is highly reducing and extremely basic (pH 12). In this bath, it is in the form of $Sn^{2+}$, $Sn^{4+}$ and principally in the form $SnO_3^{2-}$ and $HSnO_2^-$.

The color bath is chemically complex and must not be appreciably modified by the electrolysis. It contains, amongst other things, the developing agent $CD_3$ (4-amino-3-methyl-N-ethyl-N-beta-(methanesulphonamido)ethylaniline), citrazinic acid, sodium sulphite, antical agents, etc.

Figure 1:
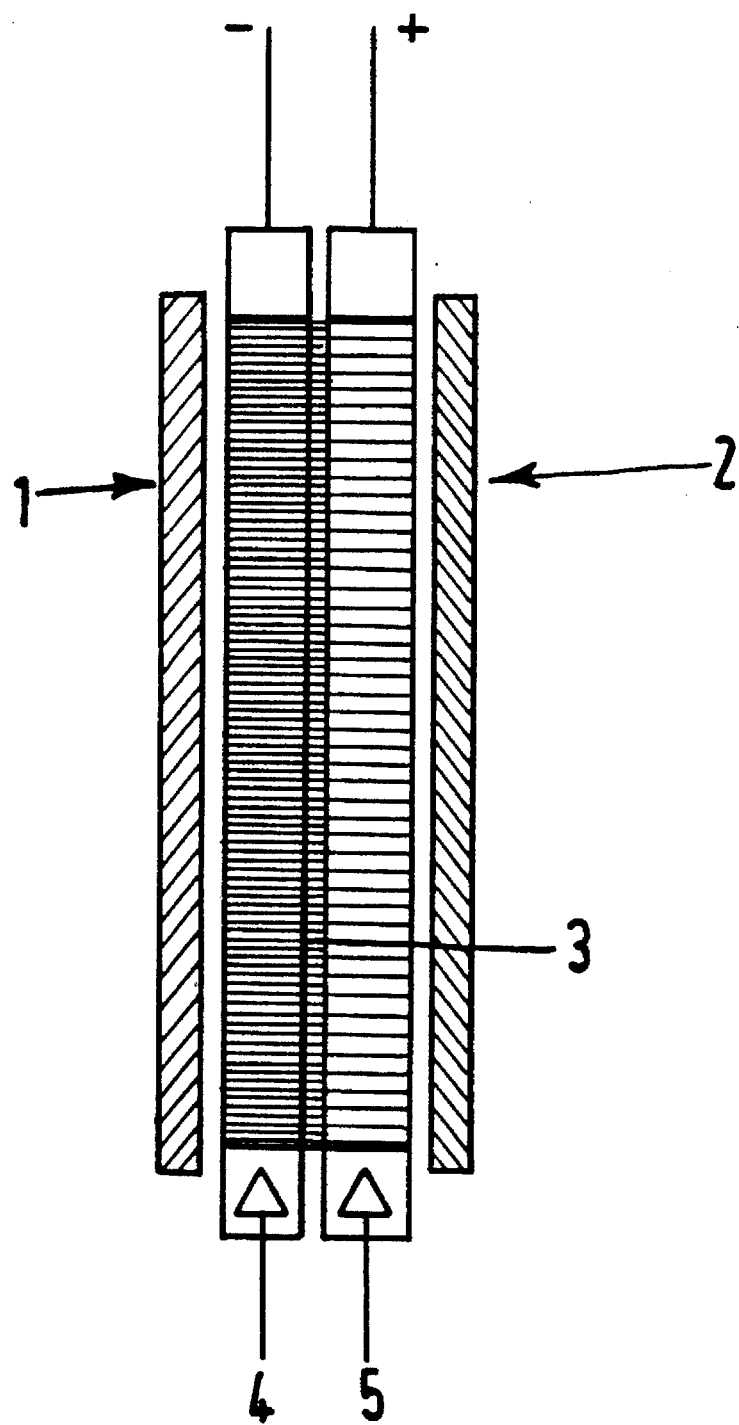
FIG. 1, which shows the electrolysis unit used in the process of the invention.

The bath is highly sensitive to oxidation, and during electrolysis unwanted reactions may also occur at the cathode, such as a reduction of the sulphite and water. This is why, in the implementation of the process according to the invention, a unit is used, as shown in FIG. 1, in which the anode (2) and cathode (1) compartments are separated, in order to prevent the organic phase of the color bath being oxidised by the anode. The cathode compartment is fed with a solution of color bath (4) maintained in an inert atmosphere (7) and the anode compartment with a buffer solution (5) with a pH of 12.

As an example, an ion-exchange membrane (3) or an organic or mineral neutral physical separator, for example porous polypropylene or a ceramic sinter, will be used as a physical separator between the anode and cathode.

An example of a membrane which can be used in the present invention is a cation exchange membrane of the NAFION$^R$ 117 type, consisting of perfluorinated copolymers with sulphonic acid groups.

The form of the electrolysis unit is not critical. For example, a cell can be used in which the anode and cathode are plates placed face to face and the electrical flow is perpendicular or parallel to the direction of flow of the solution. Other types of unit can be envisaged, such as, for example, units with a porous or volume electrode or with movable electrodes, provided that the anode and cathode compartments remain separate.

In a preferred embodiment, the electrolysis unit comprises an anode and a cathode in the form of a metal plate, or a plate made from expanded metal, porous metal or metal deposited on a plastic support. For example, the cathode may be a copper plate covered with tin and the anode a stainless steel plate.

Figure 2:
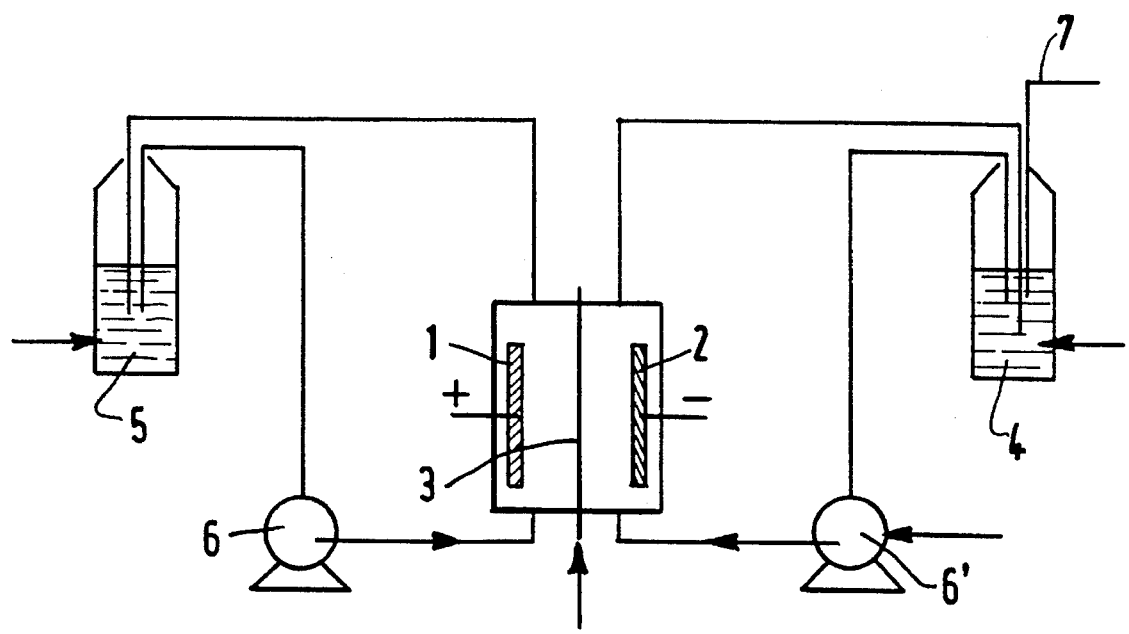
FIG. 2, which shows the system used for the electrolysis.

The device used for the electrolysis, as shown in FIG. 2, comprises two peristaltic pumps (6, 6'), which ensure the renewal of the solutions in each compartment after optimum extraction of tin. A continuous feed can be envisaged.

According to the invention, it is possible to operate in galvanostatic mode, that is to say with a constant DC or pulsed current, or in potentiostatic mode, that is to say at constant potential. The process is preferably carried out with a pulsating cathode current, the faradic efficiency being much higher in these circumstances.

In the processing of the color development baths containing tin originating from the reversal bath, the electrolysis current density must not exceed 70 mA/dm$^2$. In practice it varies between 4 and 50 mA/dm$^2$ and preferably between 16 and 25 mA/dm$^2$. The length of the $t_{work}+t_{idle}$ cycle can vary between 0.5 and 5 seconds and the duty factor $R_C$ between 25% and 85%. A preferred length of the cycle is approximately 2 seconds.

According to one embodiment of the invention, the surface area of the cathode being equal to 1.19 dm$^2$, the intensity of the electrolysis current is between 5 and 60 mA and preferably 20 and 30 mA, and the maintenance current is around 2 mA.

Using the electrolysis conditions described above, it is possible to extract up to 110 mg/l of tin from a solution which initially contained approximately 200 mg/l thereof, in less than 6 hours. In practice, it is necessary to extract the tin before the limit of 200 mg/l is reached.

The quantity of electricity used depends on the quantity of tin to be extracted. Since the tin is principally in the form $Sn^{2+}$, two faradays are therefore required to obtain $Sn^o$ from $Sn^{2+}$.

The following examples illustrate the invention.

EXAMPLE 1–14

In these examples, the process is carried out in galvanostatic mode using a solution simulating a bath of seasoned E-6® CD color developer. This developer is used during the color development in the E-6 processing of Ektachrome® reversal products.

The E-6® CD color developer contains in particular a Kodak $CD_3$® developer (4-amino-3-methyl-N-ethyl-N-beta-(methanesulphonamido)ethylaniline sulphate (3/2 $H_2SO_4$,$H_2O$)), citrazinic acid and sodium sulphite, the pH of the developer being 11.97.

$SnCl_2$ is added to this developer in a proportion of 50 to 200 mg of total tin per litre.

This solution is introduced into the cathode compartment and the buffer solution with a pH of 12 into the anode compartment of the electrolysis unit comprising a copper cathode having a surface area of 1.19 dm² and a stainless steel anode separated by an ion exchange membrane made from NAFION® 117.

The electrolysis unit is fed in accordance with the device shown in FIG. 2.

Examples 1–9

In these examples, a pulsed current is used, having a duty factor of 0.25, 0.55 and 0.85 respectively and a operating current intensity of between 14 and 57 mA.

The initial concentration of tin in the solution is respectively 87.5, 125.0 and 162 mg/l.

Table 1 contains the results obtained with regard to the reduction in the concentration of the tin (d(Sn)), the variation in the pH (dpH), the variation in concentration of CD3 (d(CD3)) the variation in concentration of sulphite (d(Sulph)), the variation in concentration of citrazinic acid (d(CZA)) as a function of the intensity of the operating current and the initial tin concentration and the duty factor $R_C$.

The negative values in Table I are due to the imprecision of the measurement.

It can be seen, comparing respectively Examples 1 and 3, 4 and 6, 7 and 9, that, for the same current intensity and the same duty factor, the percentage of tin extraction is higher if the initial concentration of tin is higher.

With all the examples, no signification variation in pH is observed, and the concentrations of the other constituents of the bath do not under these conditions vary by more than 10%.

The faradic efficiency is between 7 and 21%.

Example 10

In this example, a pulsed current, a duty factor of 0.25 and a operating current intensity of between 5 and 80 mA are used.

The initial concentration of tin in the solution is between 5 and 170 mg/l.

Figure 3:
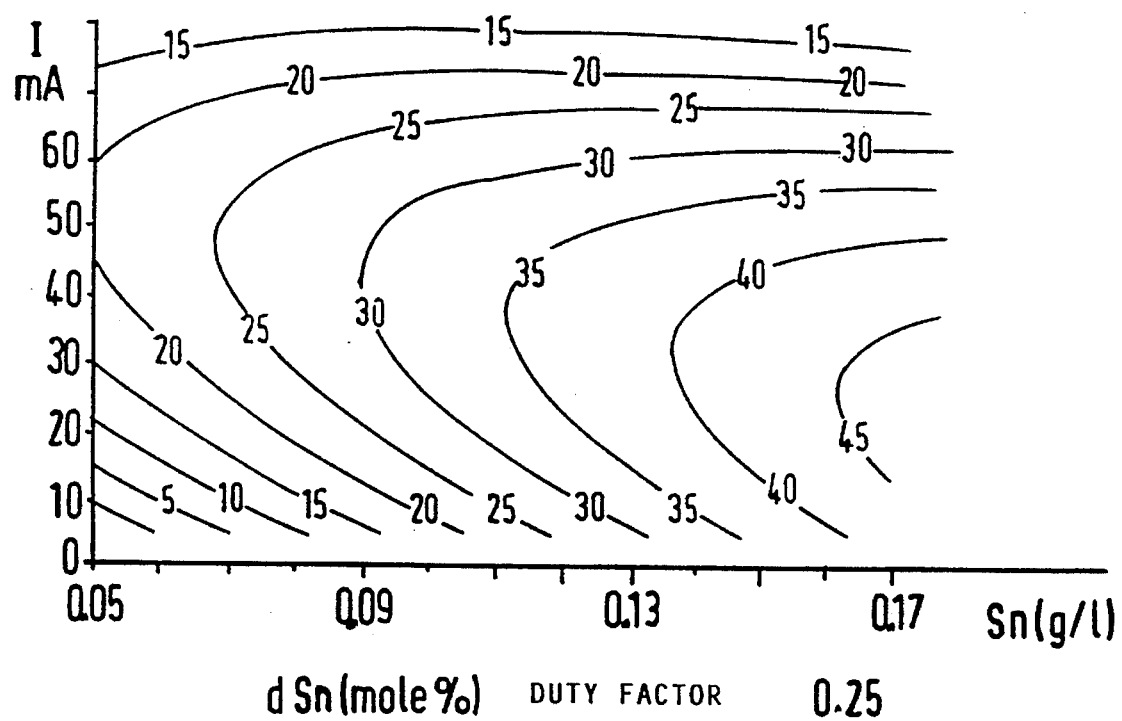
FIG. 3, which shows the isoresponse curves relating to the reduction in the tin concentration with a duty factor of 0.25.

In the results given in the form of isoresponse curves in FIG. 3, a maximum reduction in the tin concentration of 45% is observed, with an intensity of between 10 and 35 mA.

In all cases, the CD3 concentration is reduced by less than 8%, the citrazinic acid concentration by less than 6%, and the sulphite concentration by less than 4%, and the pH does not increase by more than 0.1 units.

The faradic efficiency is greater than 22.5% for an initial tin concentration of more than 160 mg/l and an intensity of 25 mA.

Example 11

The process is carried out under the same conditions as in Example 10 except that the duty factor is 0.55.

Figure 4:
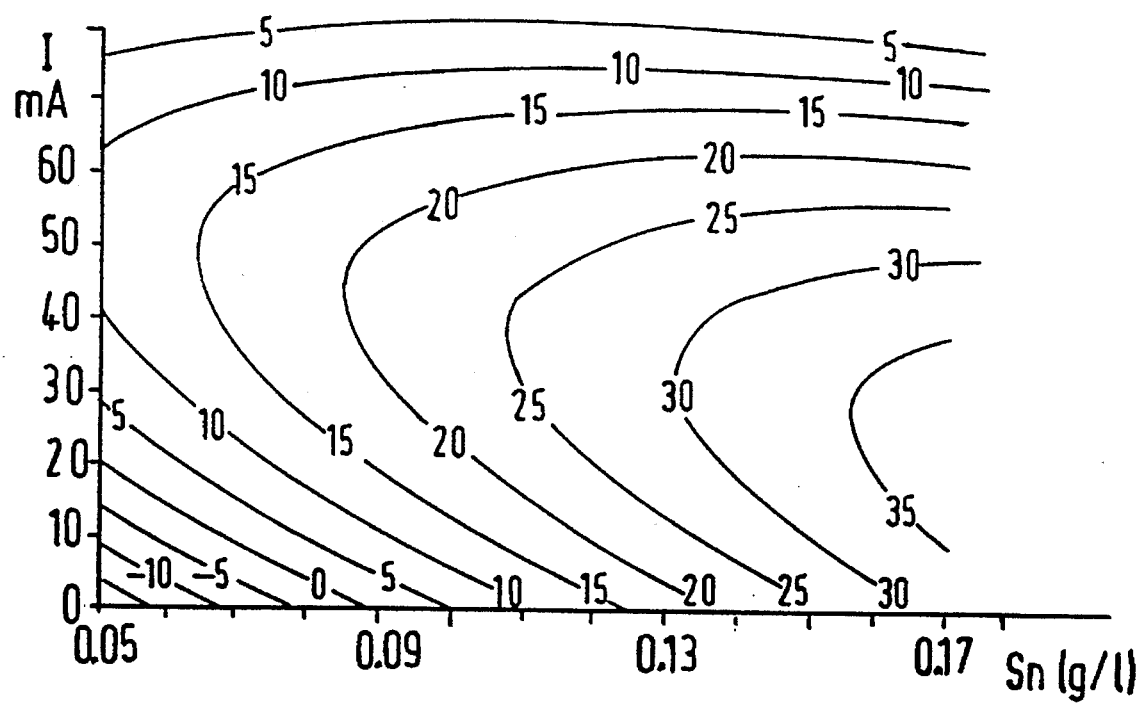
FIG. 4, which shows the isoresponse curves relating to the reduction in the tin concentration with a duty factor of 0.55.

In the results given in the form of isoresponse curves in FIG. 4, a maximum reduction in the tin concentration of 35% is observed only with an intensity of between 20 and 50 mA.

In all cases, the CD3 concentration is reduced by less than 9%, the citrazinic acid concentration by less than 4%, and the sulphite concentration by less than 4%, and the pH does not increase by more than 0.03 units. The faradic efficiency is less than 17.5%.

Example 12

The process is carried out under the same conditions as in Example 10 except that the duty factor is 0.85.

Figure 5:
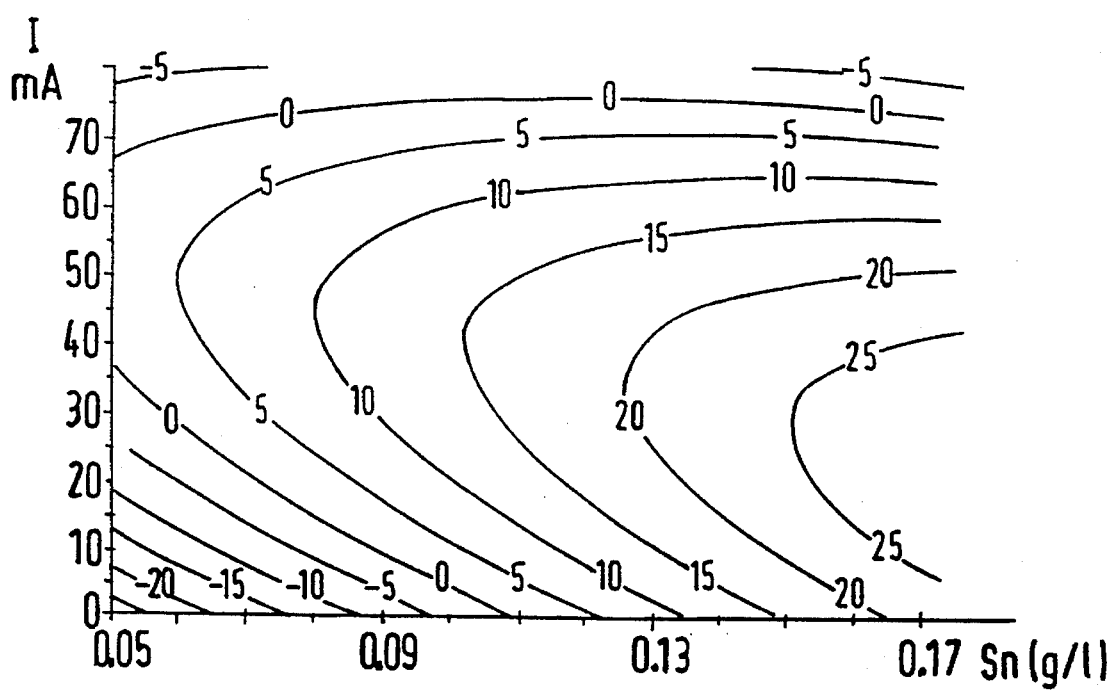
FIG. 5, which shows the isoresponse curves relating to the reduction in the tin concentration with a duty factor of 0.85.

In the results given in the form of isoresponse curves in FIG. 5, a maximum reduction in the tin concentration of 25% is observed only with an intensity of between 5 and 40 mA.

In all cases, the CD3 concentration is reduced by less than 3%, the citrazinic acid concentration by less than 3%, and the sulphite concentration by less than 2%, and the pH increases by no more than 0.03 units.

The faradic efficiency is less than 12.5%.

Examples 10–12 show that a greater reduction in the tin concentration is obtained with a low duty factor.

Example 13

In this example, a DC current with an intensity of between 62.5 mA and 100 mA is used, which is higher than in the previous examples.

The initial tin concentration in the solution is 170 mg/l.

Figure 6:
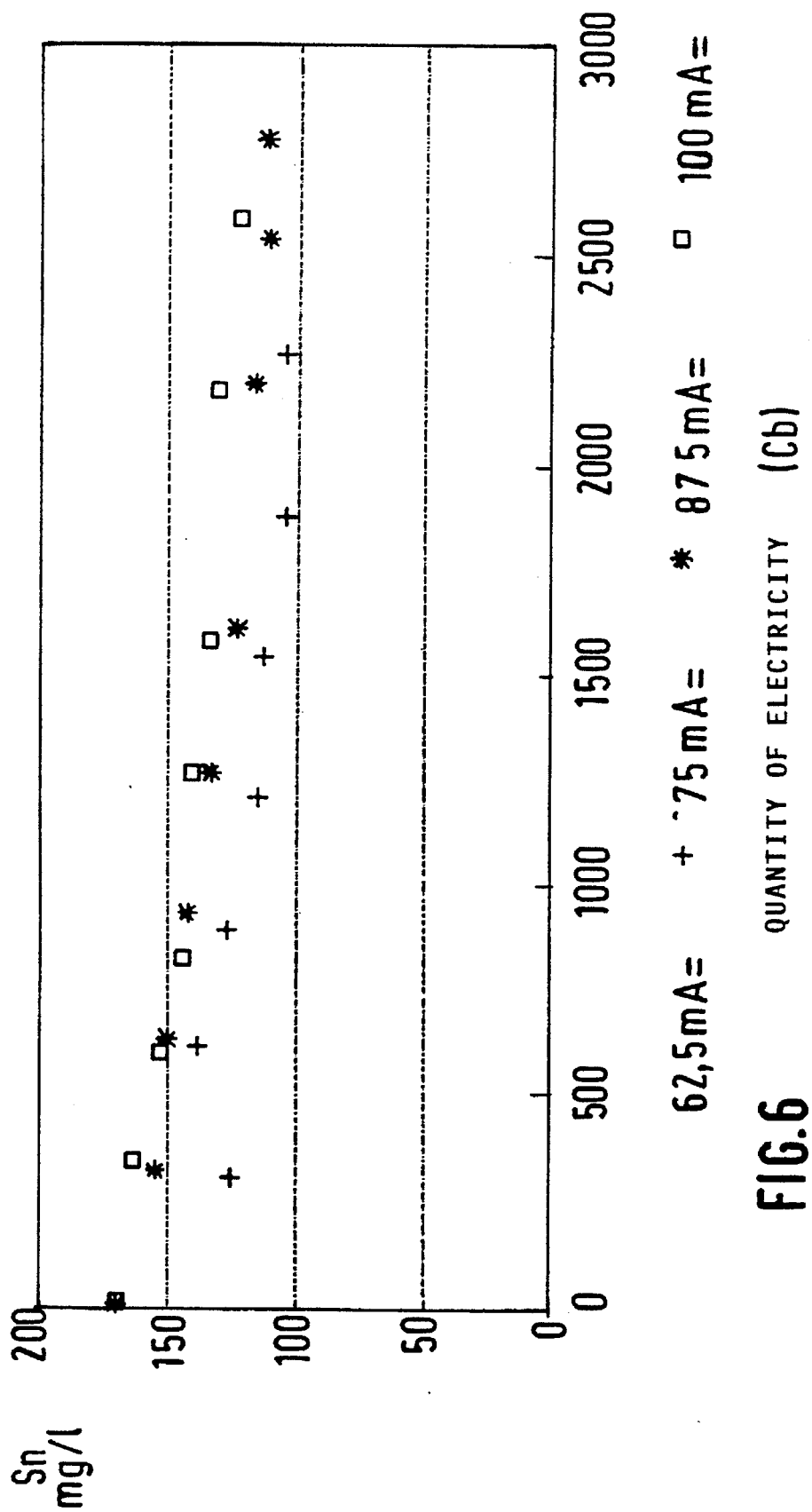
FIG. 6, which shows the reduction in the tin concentration as a function of the quantity of electricity with DC current.

The results are given in FIG. 6, where it can be seen that the tin concentration can be reduced by 40% by using a DC current and a relatively high quantity of electricity. It can be seen that, in order to achieve a concentration of 100 mg/l starting with an initial concentration of 170/l, at least 2000 coulombs is required, the best result being obtained with an intensity of 75 mA.

The faradic efficiency is much lower than in Examples 1–12 since it does not exceed 1.2%.

Example 14

In this example, a cyclic current is used, with a duty factor of 0.25 and an intensity of between 62.5 mA and 100, as in Example 13.

The solution is the same as in Example 13.

TABLE 1

| Ex No | Sn (mg/l) | I (mA) | Rc | dSn (mole %) | dpH (pH units) | d(CD3) (mole %) | d(Sulph) (mole %) | d(CZA) (mole %) |
|---|---|---|---|---|---|---|---|---|
| 1 | 87.5 | 25.20 | 0.25 | 26.80 | 0.035 | −0.96 | 1.72 | 2.04 |
| 2 | 125.0 | 48.59 | 0.25 | 41.61 | 0.090 | 4.71 | 4.30 | 4.25 |
| 3 | 162.5 | 25.20 | 0.25 | 41.57 | 0.100 | 8.10 | 4.01 | 6.66 |
| 4 | 87.5 | 56.38 | 0.55 | 15.28 | 0.025 | 3.25 | 1.03 | 2.27 |
| 5 | 125.0 | 33.00 | 0.55 | 33.06 | 0.020 | 4.76 | 3.85 | 2.12 |
| 6 | 162.5 | 56.38 | 0.55 | 25.73 | 0.025 | 9.49 | 2.33 | 4.25 |
| 7 | 87.5 | 40.79 | 0.85 | 13.73 | 0.025 | 1.30 | −1.47 | 0.00 |
| 8 | 125.0 | 17.41 | 0.85 | 17.63 | 0.030 | −0.19 | 1.64 | 2.62 |
| 9 | 162.5 | 40.79 | 0.85 | 23.95 | 0.025 | 2.72 | 2.34 | 2.22 |

Figure 7:
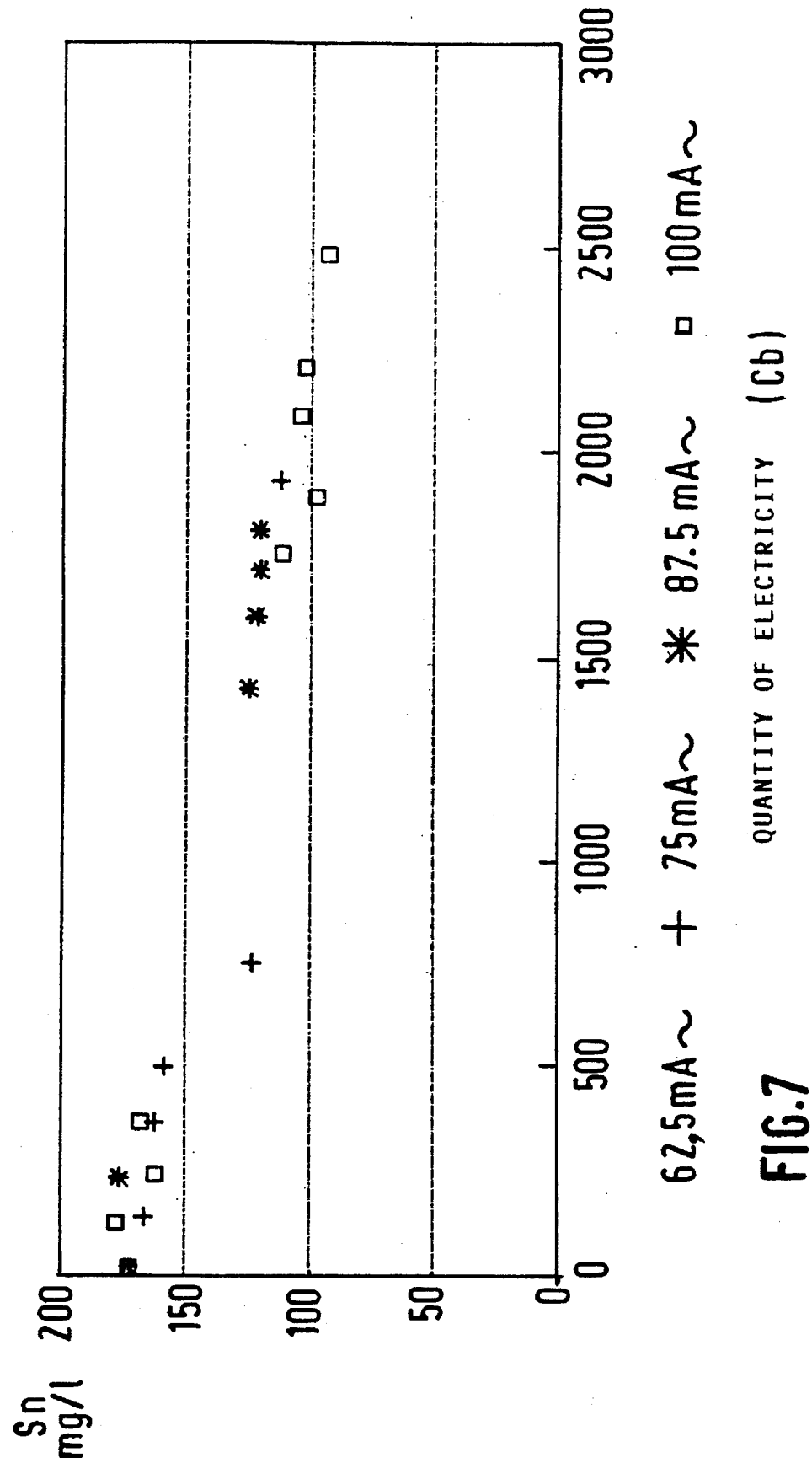
FIG. 7, which shows the reduction in the tin concentration as a function of the quantity of electricity with a cyclic current having a duty factor of 0.25.

The results are given in FIG. 7, where it can be seen that the tin concentration can be reduced by 40%, using a cyclic current and a slightly less high quantity of electricity than in Example 13, with a faradic efficiency substantially the same as in Example 13.

From Examples 13 and 14, it can be seen that the tin can be extracted using DC or pulsed current and high intensities, but with a very low faradic efficiency.

EXAMPLES 15–17

In these examples, the process is carried in potentiostatic mode. A solution consisting of 450 cc of the E-6® CD replenisher and 50 cc of the E-6® reversal bath is prepared. This solution contains 152 mg/l of tin and has a pH of 12. The composition of the E-6® CD replenisher differs from that of the E-6® CD developer through the absence of halides.

The same device is used as in the previous example.

Example 15

The electrolysis is carried out on 50 cc of this solution with a constant potential of −1.303 V/ENH with a maximum cathode current of 68.9 mA. In this way the tin concentration is reduced by 47% whilst the concentration of CD3 in the solution has varied only by +1%.

The quantity of electricity used is 77.45 coulombs, which corresponds to a faradic efficiency of 7.6%.

Example 16

The previous example is repeated, using a constant potential of −1.103 V/ENH and a maximum cathode current of 73.2 mA. In this way the tin concentration is reduced by 36.8% whilst the concentration of CD3 in the solution has varied only by +1%.

The quantity of electricity used is 65 coulombs, which corresponds to a faradic efficiency of 6.9%.

Example 17

The previous example is repeated, using a constant potential of −1.503 V/ENH and a maximum cathode current of 172 mA. In this way the tin concentration is reduced by 15.2% whilst the concentration of CD3 in the solution has varied by +2.6%.

The quantity of electricity used is 65 coulombs, which corresponds to a faradic efficiency of 2.8%.

According to Examples 15–17, it can be seen that it is possible to operate in potentiostatic mode. However, this embodiment is more constraining and less easy to implement industrially than the galvanostatic mode.

I claim:

1. Electrolytic process for recovering tin contained in an aqueous organic solution having a highly reducing nature and a pH of more than 10, where the tin is in a quantity of less than 1 g/l, principally in a chelated form, in which an electrolysis unit comprising an anode compartment and a cathode compartment separated by a physical barrier is used, the organic solution is introduced into the cathode compartment and the electrolysis is carried out in galvanostatic mode with a pulsed electrolysis current with a duty factor $R_C$ of between 25% and 85%, $R_C$ being defined by the formula: $R_C = t_{work}/(t_{idle} + t_{work})$ where $t_{work}$ represents the time during which a operating current with a current density of between 4 and 50 mA/dm$^2$ is passed through the cathode and $t_{idle}$ represents the time during which a steady state current is passed, the intensity of which represents approximately 10 to 20% of the operating current.

2. Process according to claim 1, in which the total $t_{idle} + t_{work}$ is equal to 2 seconds.

3. Process according to claim 1, in which the electrolysis current density is between 16 and 25 mA/dm$^2$ and the duty factor is 0.25.

4. Process according to claim 1, in which the anode compartment is separated from the cathode compartment by an ion exchange membrane or a neutral physical separator.

5. The process according to claims 1 wherein tin is extracted from the color development bath in the E-6® processing of reversal photographic products.

6. The process of claim 5 wherein the color development bath has been recycled.

* * * * *